United States Patent [19]

Taylor et al.

[11] E Patent Number: Re. 31,933

[45] Reissued Date of Patent: Jul. 2, 1985

[54] HIGH TEMPERATURE WELL PACKER

[75] Inventors: Donald F. Taylor, Dallas; James H. Bostock, Denton, both of Tex.

[73] Assignee: Otis Engineering Corporation, Dallas, Tex.

[21] Appl. No.: 482,323

[22] Filed: Apr. 4, 1983

Related U.S. Patent Documents

Reissue of:

[64] Patent No.: 4,296,806
Issued: Oct. 27, 1981
Appl. No.: 82,406
Filed: Oct. 5, 1979

[51] Int. Cl.[3] ..... E21B 33/128; E21B 33/129; F16J 15/12; F16J 15/14

[52] U.S. Cl. ..... 166/120; 166/196; 166/139; 166/140; 277/235 R; 277/DIG. 6

[58] Field of Search ..... 166/120, 138, 139, 140, 166/179, 196, 212, 209, 210, 217; 277/235 R, DIG. 6

[56] References Cited

U.S. PATENT DOCUMENTS

| | | | |
|---|---|---|---|
| 2,143,106 | 1/1939 | Freedlander | 277/235 R |
| 2,430,623 | 11/1947 | Taylor, Jr. et al. | 166/179 X |
| 2,546,950 | 3/1951 | Nixon | 166/212 |
| 2,638,168 | 5/1953 | Parks | 166/120 |
| 2,696,886 | 12/1954 | Ware | 166/139 X |
| 2,715,442 | 8/1955 | Brown | 166/139 |
| 2,901,044 | 8/1959 | Arnold | 166/212 X |
| 3,330,357 | 7/1967 | Elliston | 166/134 |
| 3,385,366 | 5/1968 | Elliston | 166/134 |
| 3,391,740 | 7/1968 | Edwards, Jr. | 166/120 |
| 3,391,742 | 7/1968 | Davis | 166/139 |
| 3,404,061 | 10/1968 | Shane et al. | 428/143 |
| 4,050,517 | 9/1977 | Matthews | 166/387 |
| 4,131,160 | 12/1978 | Cochran | 166/120 |
| 4,146,093 | 3/1969 | Horvath et al. | 166/120 |
| 4,176,715 | 12/1979 | Bigelow et al. | 166/138 |

OTHER PUBLICATIONS

*The Condensed Chemical Dictionary*, Eighth Edition, 1971, Van Nostrand Reinhold Company, N.Y., pp. 367, 395, 849 and 931.

*Primary Examiner*—Stephen J. Novosad
*Attorney, Agent, or Firm*—Thomas R. Felger

[57] ABSTRACT

A well packer for use in geothermal wells or [stem] *steam* injection wells. The packer can be anchored to the inner wall of a casing string to resist differential pressure in either direction. The anchoring means includes a single set of slip elements which are hydraulically or mechanically set. The packer includes a sealing unit with packing elements especially adapted for high temperature wells. The packer can be simply released from the casing by upward tension on the tubing.

22 Claims, 24 Drawing Figures

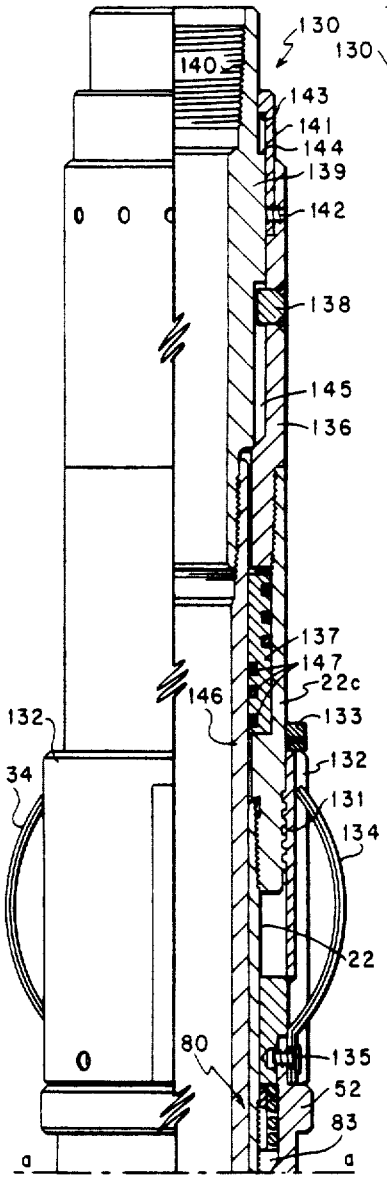
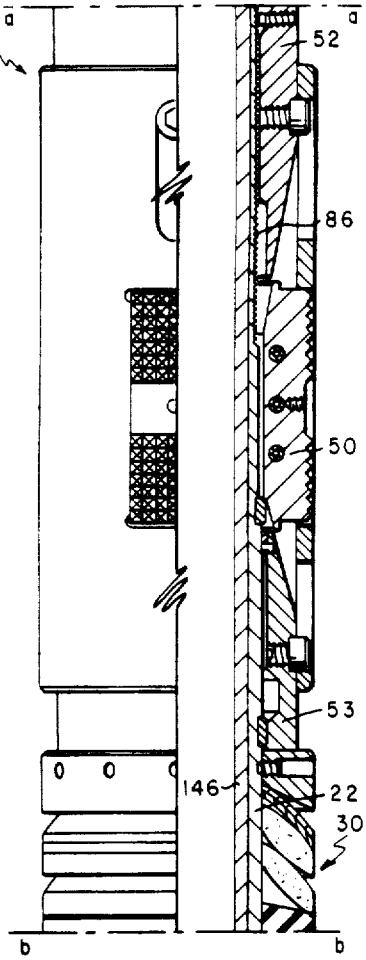
FIG. 16B
FIG. 16A

HIGH TEMPERATURE WELL PACKER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is particularly adapted for use in high temperature wells where steam is injected into an underground formation to enhance the recovery of hydrocarbons. The present invention can also be used in high pressure/high temperature geothermal wells.

2. Description of the Prior Art

For many years packers have been used to provide a seal between a tubing string and a casing string within a well bore. Generally, formation fluids enter the bore of the casing string below the packer and are directed to flow to the well surface through the tubing string by the packer. Thus, the casing above the packer is protected from the formation fluids. Also, the well is easier to control by confining the formation fluids to the tubing string.

The use of packers and tubing is even more important while injecting high temperature and pressure steam into a hydrocarbon formation or in recovering energy from deep geothermal wells. U.S. Pat. Nos. 3,330,357 and 3,385,366 to T. L. Elliston show packers using asbestos rings to form a seal under high temperature conditions. U.S. Pat. No. 4,050,517 discloses flexible seals to compensate for the high temperatures found in geothermal wells.

Pending U.S. Patent Application Ser. No. 961,139 to Joseph L. Pearce et al discloses using elastomeric material reinforced with wire mesh in pumpdown piston elements. The reinforced elastomeric material displays markedly improved wear characteristics while the pumpdown element is moving through a well conduit. Various patents cited in this application, including U.S. Pat. No. 2,143,106 to A. L. Freedlander, disclose reinforcing elastomeric material with metal for use in oil and gas wells.

None of these patents show nor teach a packer having a sealing unit or anchoring means in accordance with the present invention.

SUMMARY OF THE INVENTION

The present invention discloses a packer for forming a seal with the inner wall of a casing string disposed within a well bore, comprising means for connecting the packer to a tubing string disposed within the casing string, mandrel means having a longitudinal flow passage to provide fluid communication through the packer, means for anchoring the packer to the inner wall of the casing string intermediate the ends of the casing string, means for releasing the packer from the inner wall of the casing string, a sealing unit attached to the exterior of the mandrel means having a first position in which the sealing unit is relaxed and a second position in which the sealing unit is longitudinally compressed and radially expanded to contact the inner wall, and the sealing unit comprising a center element made from elastomeric material and end elements of elastomeric material and wire mesh.

One object of the present invention is to provide a well packer having a sealing unit with elastomeric material reinforced by wire mesh.

Another object of the present invention is to provide a well packer which can form a seal between casing and tubing while subjected to high pressure and temperature.

A further object of the present invention is to provide a well packer having a single set of slips which can withstand differential pressure in either direction.

Still another object of the present invention is to provide a sealing unit having an array of packing elements comprising a center element, a plurality of end elements disposed on either side of the center element, and one or more concaved reinforcing discs at each end of the array.

Another object of the present invention is to provide a packer which can be either hydraulically or mechanically set and released by upward tension on the tubing string.

A still further object of the present invention is to provide a packer having a sealing unit with the geometric shape of the packing elements allowing selective, longitudinal compression of the center element and end elements.

Additional objects and advantages of the present invention will be readily apparent from reading the detailed description in conjunction with the drawings.

DESCRIPTION OF THE PREFERRED EMBODIMENT

Figures 1A, 1B:
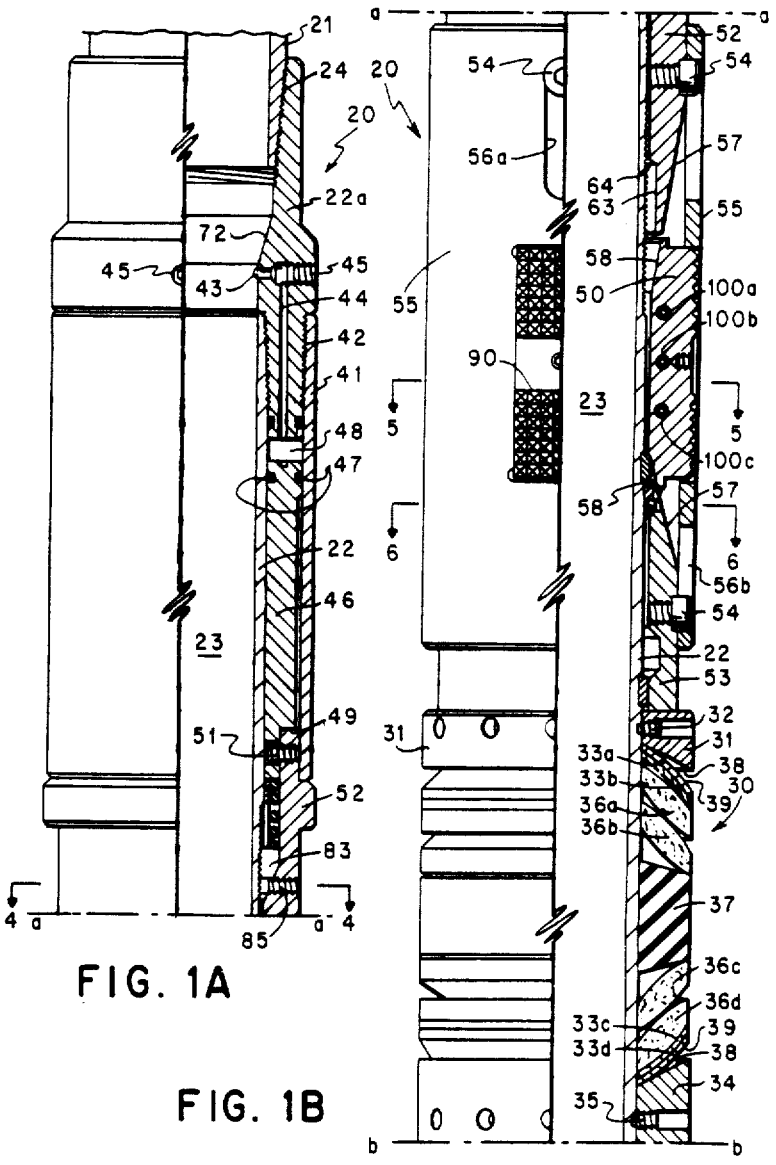
FIGS. 1A, B, and C are drawings, partially in section and partially in elevation, showing a hydraulic set packer of the present invention with the anchoring means and sealing unit in their first position as the packer is lowered into a casing string.
Figure 1C:
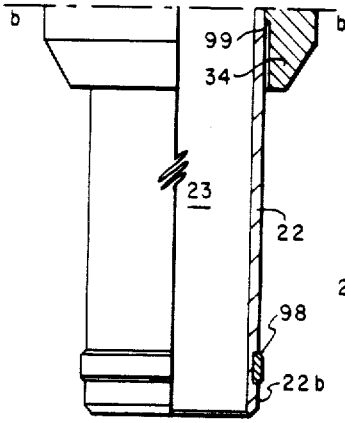

Referring to the drawings and particularly FIGS. 1A, 1B, and 1C, well packer 20 is attached to tubing string 21. FIGS. 1A, 1B, and 1C show packer 20 with sealing unit 30 and slip means 50 each in their respective first position. This is the normal condition in which packer 20 would appear prior to being installed in a well and while being lowered by tubing string 21 through the bore of a casing string.

Packer 20 comprises a mandrel means 22 which has a longitudinal flow passage 23 therethrough. Longitudinal passage 23 is concentric with the bore of tubing 21 and communicates fluid from below packer 20 to tubing 21. Mandrel means 22 includes an adapter sub 22a which has threads 24 formed on one end to provide a means for connecting packer 20 to tubing string 21. Various well tools or additional tubing could be attached to mandrel means 22 at its lower end 22b.

The major components of packer 20 are generally cylindrical and carried on the exterior of mandrel means 22. Means for anchoring packer 20 to the inner wall of a casing string includes piston housing 41 which is engaged by threads 42 to the exterior of adapter sub 22a. Lateral ports 43 and longitudinal ports 44 formed in adapter sub 22a communicate fluid from longitudinal flow passage 23 to the interior of piston housing 41. Plugs 45 are threadedly engaged from the exterior of adapter sub 22a into lateral ports 43. Plugs 45 provide means for flushing ports 43 and 44 when packer 20 is at the well surface. When plugs 45 are installed, they prevent fluid within longitudinal passage 23 from escaping to the exterior of packer 20.

Piston 46 is slidably disposed between piston housing 41 and the exterior of mandrel means 22. Piston seals 47, carried on the end of piston 46, form a slidable fluid barrier. Variable volume fluid chamber 48 is partially defined by the exterior of mandrel means 22, the inside diameter of piston housing 41, and piston seals 47. Fluid pressure within longitudinal flow passage 23 can be communicated by ports 43 and 44 to variable volume chamber 48 to move piston 46 longitudinally with respect to mandrel means 22. As will be explained later, this movement of piston 46 causes slip means 50 to extend radially from mandrel means 22 anchoring packer 20 to the inner wall of casing 25. Since piston housing 41 is engaged by threads 42 to adapter sub 22a, the location of piston housing 41 relative to mandrel means 22 remains fixed while running, setting, and pulling packer 20.

The end of piston 46 opposite piston seals 47 is engaged by screws 51 to upper or first expander ring 52. Shoulder 49, formed on piston 46, abuts first expander ring 52. Slip means 50 is expanded radially by moving first expander ring 52 and second or lower expander ring 53 longitudinally towards each other. Each expander ring is generally cylindrical and carried on the exterior of mandrel means 22. Four lugs 54 are threaded into holes in the outside diameter of first expander ring 52. Guide lugs 54 on first expander ring 52 are spaced radially 90° from each other. Two lugs 54, spaced radially 180° from each other, are attached by threads to the exterior of second expander ring 53.

Housing means 55 is generally a cylinder surrounding mandrel means 22. Expander rings 52 and 53 are partially disposed within the ends of housing 55 between the exterior of mandrel means 22 and the inside of housing means 55. Longitudinal guide slots 56 are cut in housing 55 near both ends thereof. Guide lugs 54 are slidably disposed within slots 56. Lugs 54 and slots 56 provide a means for interconnecting housing 55 and expander rings 52 and 53 are still allowing limited movement relative to each other.

Each expander ring has a tapered camming surface 57 on the end adjacent to slip means 50. Frusto-conical surfaces 58 are formed on the inside diameter of slip means 50 near either end thereof. Camming surfaces 57 and frusto-conical surfaces 58 are generally matching. Therefore, movement of expander rings 52 and 53 towards each other causes camming surfaces 57 to act as wedges projecting slip means 50 radially from mandrel means 22.

Figure 13:
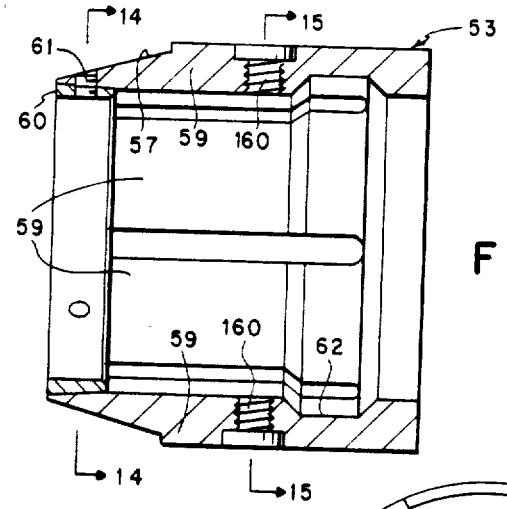
FIG. 13 is an enlarged sectional view of the second or lower expander ring.
Figure 14:
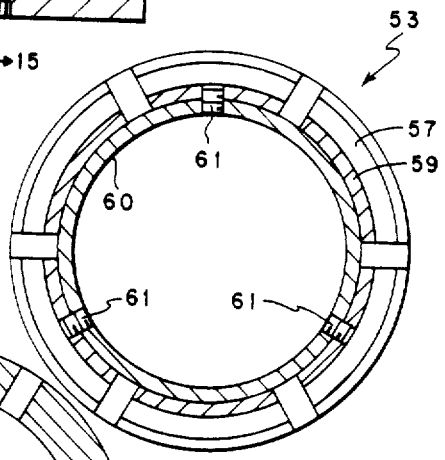
FIG. 14 is a cross section taken along line 14—14 of FIG. 13.
Figure 15:
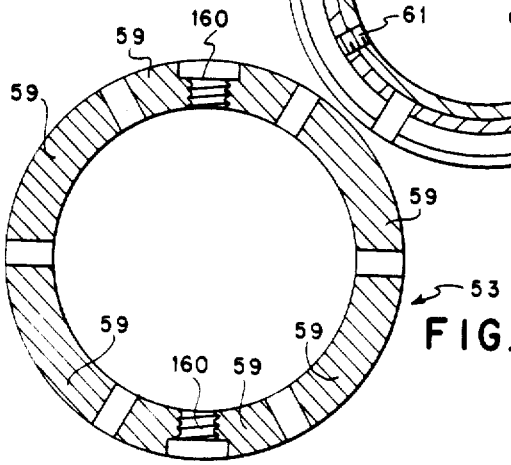
FIG. 15 is a cross section taken along line 15—15 of FIG. 13.

Lower expander ring 53 is best shown in FIGS. 13, 14, and 15. Camming surface 57 is formed on the exterior of collet fingers 59. The six collet fingers 59 can flex inwardly. Threaded holes 160 are machined in two opposing collet fingers 59 for lugs 54 to be secured therein. Collet support ring 60 is shown secured by releasable means to the inside diameter of collet fingers 59. The releasable means comprises three shear pins 61 spaced radially 120° connecting collet support ring 60 to three of the collet fingers 59. A large recess 62 is machined in the inside diameter of second expander ring 53 to facilitate inward flexing of collet fingers 59.

First expander ring 52 has an enlarged inside diameter 63 opposite a portion of its camming surface 57. Shoulder 64 is formed by enlarged inside diameter 63. As will be explained later, shoulder 64 and collet support ring 60 comprise a portion of the means for releasing packer 20 from the inner wall of casing string 25.

Sealing unit 30 is carried on the exterior of mandrel means 22 longitudinally adjacent to second expander ring 53. Sealing unit 30 comprises a first or upper support ring 31 which is releasably secured to mandrel 22 by shear screws 32. A second or lower support ring 34 is releasably secured to the exterior of mandrel 22 and spaced longitudinally from first support ring 31. Shear screws 35 releasably secure support ring 34 to mandrel mean 22. The first position of sealing unit 30 in which it is relaxed is defined by shear screws 32 and 35 securing their respective support ring to mandrel 22.

Various arrays of packing elements can be carried on the exterior of mandrel 22 between support rings 31 and 34. The array shown in FIG. 1B comprises metal backup rings or discs 33a, 33b, 33c, and 33d, end elements 36a, 36b, 36c, and 33d and center elements 37. As will be explained later, various combinations of center and end elements have been found to provide a fluid tight seal under high pressure and temperature conditions. To provide for improved support of the packing elements, each support ring has a concaved surface 38 facing a similar convex surface 39 on the backup rings 33. Sealing element 30 is shown in FIG. 1B in its first, relaxed position.

Figure 2A:
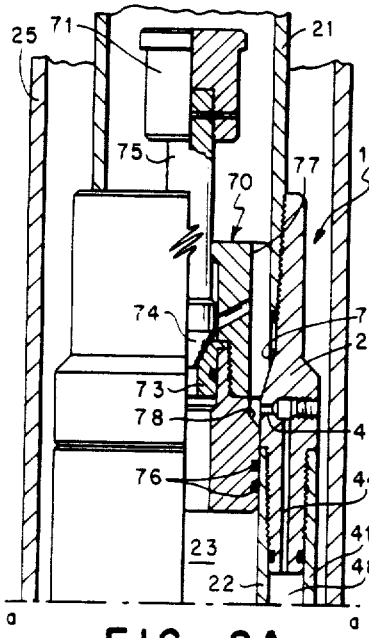
FIGS. 2A, 2B, and 2C, partially in section and partially in elevation, show the hydraulic set packer with the anchoring means and the sealing unit in their second position forming a seal with the inner wall of the casing string.
Figure 2B:
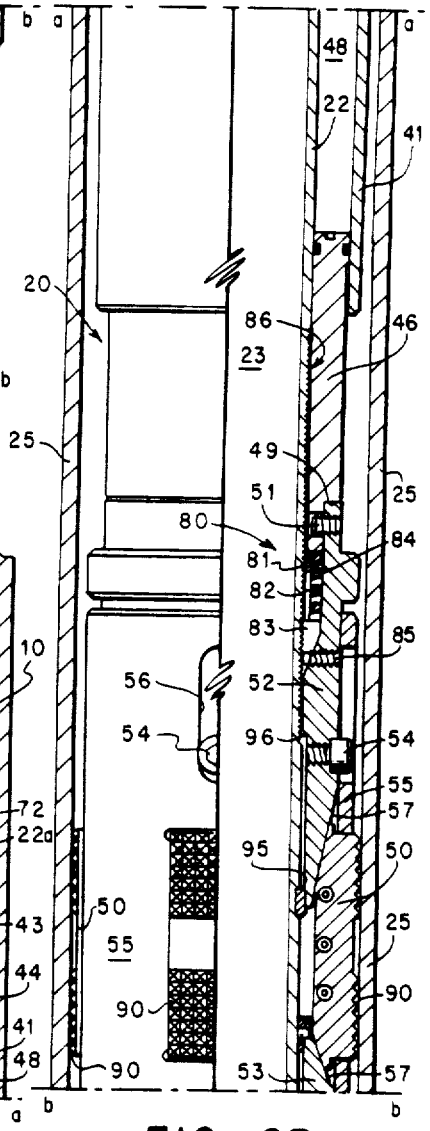
Figure 2C:
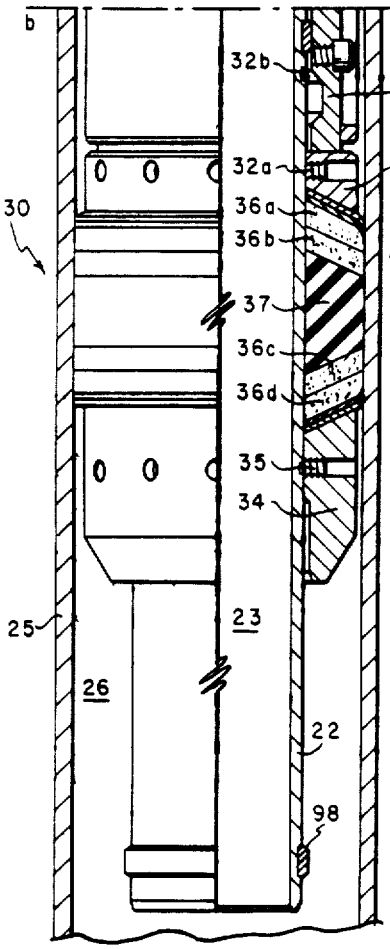

Referring generally to FIGS. 2A, 2B and 2C, packer 20 is shown anchored to the inner wall of casing 25 by slip means 50. Sealing unit 30 is shown in its second position forming a fluid tight seal between casing 25 and mandrel means 22. Thus, any fluid entering casing 25 below packer 20 is directed by sealing unit 30 to flow to the well surface through longitudinal flow passage 23 and tubing string 21. In the same manner, if a high temperature fluid is injected from the well surface to an underground formation, sealing unit 30 prevents the high temperature fluid from contacting the inner wall of casing 25 above packer 20.

Setting tool 70 is shown disposed within the upper portion of longitudinal flow passage 23. Fishing neck 71 is provided on setting tool 70 so that tool 70 can be raised and lowered by conventional wireline techniques through tubing 21. Adapter sub 22a has a reduced inside diameter portion 72 which forms a tapered shoulder for tool 70 to rest on. O-rings 76 are carried on the exterior of tool 70 and form a fluid tight seal with the inside diameter of mandrel means 22 when tool 70 is resting on shoulder 72. A valve means consisting of valve seat 73, valve disc 74 and valve stem 75 is contained within tool 70. Fishing neck 71 is attached to one end of valve stem 75 and valve disc 74 is attached to the other. Therefore, when fishing neck 71 is pulled upward, valve disc 74 is lifted from valve seat 73 opening a fluid passage through setting tool 70. The weight of valve stem 75 and disc 74 plus any difference in fluid pressure above tool 70 as compared to below tool 70 tends to close the valve means. When tool 70 is resting on tapered shoulder 72, o-rings 76, disc 74 and seat 73 cooperate to prevent fluid above tool 70 from flowing into longitudinal flow passage 23 below tool 70.

Longitudinal slots 77 are machined in the circumference of tool 70 from the end opposite o-rings 76. Slots 77 connect with groove 78 machined in the outside diameter of tool 70 intermediate the ends thereof. Slots 77 and groove 78 are sized to allow fluid within tubing 21 to communicate with ports 43 and 44 when tool 70 is resting on shoulder 72. An increase in fluid pressure within tubing 21 can thus be communicated to variable volume fluid chamber 48. The increased fluid pressure causes piston 46 to move in one direction relative to mandrel means 22.

Internal slip means 80 are disposed between the inside diameter of first expander ring 52 and the exterior of mandrel means 22. Internal slip means 80 consists of a ring 81 with a longitudinal slot 82 formed therein. An enlarged wedge 83 is formed on one end of ring 81. Spring 84 is disposed around the circumference of ring 81. One end of spring 84 rests on the end of piston 46 and the other on wedge 83. Spring 84 biases internal slip means 80 in the one direction away from piston 46. Guide screw 85 is secured to the inside diameter of first expander ring 52 and rides in slot 82 to prevent rotation of slip means 80 relative to expander ring 52. The exterior of mandrel means 22 in the vicinity of internal slip means 80 has a rough surface 86 which is designed to engage matching teeth on the inside diameter of wedge 83. Internal slip means 80 thus allows expander ring 52 to be moved in the one direction by piston 46. When the fluid pressure in chamber 48 is reduced, wedge 83 engages rough surface 86 and prevents expander ring 52 from moving in the other direction relative to mandrel means 22.

As previously noted, sealing unit 30 comprises an array of packing elements carried between first support ring 31 and second support ring 34. Shear screws 32 provide a means for releasably securing support ring 31 to mandrel means 22. Shear screws 35 provide a means for releasably securing support ring 34 to mandrel means 22. Less force can be preselected to release support ring 31 from mandrel means 22 as compared to support ring 34 by installing fewer screws 32 than screws 35. Alternatively, screws 32 can be selected from material having a lower shear valve as compared to screws 35.

As best shown in FIGS. 2B and 2C, movement of piston 46 in one direction relative to mandrel means 22 causes the upper and lower expander rings to move towards each other. Camming surfaces 57 cooperate to radially extend slip means 50 from mandrel means 22. Serrated, diamond shaped teeth 90 are formed on the outside diameter of slip means 50 and engage the inside diameter of casing string 25. With the anchoring means in its second position as shown in FIG. 2B, packer 20 resists movement in either direction within the bore of casing 25.

After teeth 90 are set or engaged with casing 25, increased fluid pressure within chamber 48 will cause mandrel means 22 to continue in the one direction relative to internal slip means 80. This continued movement causes force to be applied to upper support ring 31 which abuts lower expander ring 53. The pressure applied to variable volume chamber 48 is preselected to cause screws 32 to shear into two portions 32a and 32b as shown in FIG. 2C. Since screws 35 are preselected to require more force before they will shear, the continued movement of mandrel means 22 in the one direction causes second support ring 34 to move towards first support ring 31. The movement of the support rings towards each other causes longitudinal compression and radial expansion of the packing elements.

As best shown in FIG. 2C, sealing unit 30 forms a fluid tight seal between mandrel means 22 and casing 25. Center element 37 and end elements 36a, 36b, 36c, and 36d are preselected from materials found to be particularly suited for use with high temperature fluid. One of the preferred compounds for center element 37 is ethlene propylene-diene terpolymer, sometimes referred to as EPDM. The end elements preferably used with EPDM are made from vinylidene fluoride and/or hexafluoropropylene copolymer reinforced with wire mesh. Vinylidene fluoride is sometimes referred to as VITON and hexafluoropropylene is sometimes referred to as FLUOREL. VITON is a registered trademark belonging to E. I. DuPont De Nemours & Co., Inc. FLUOREL is a registered trademark belonging to 3M Co. After some high temperature tests, center element 37 would still be in a liquid or near liquid state when packer 20 was removed from the test facility. However, sealing unit 30 withstood high differential pressures in either direction when end elements reinforced with wire mesh were used. As will be later explained, the geometry of the end elements 36 and metal backup rings 33 results in increasing the differential pressure capabilities of sealing unit 30 and allowing selective compression of the packing elements.

Figure 3A:
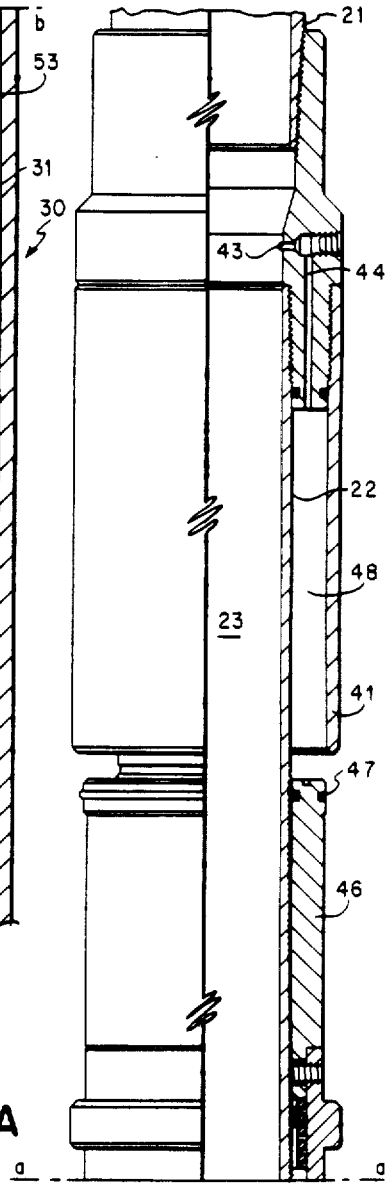
FIGS. 3A, 3B, and 3C, partially in section and partially in elevation, show the hydraulic set packer with the sealing unit in its third position as the packer is removed from a casing string.
Figure 3B:
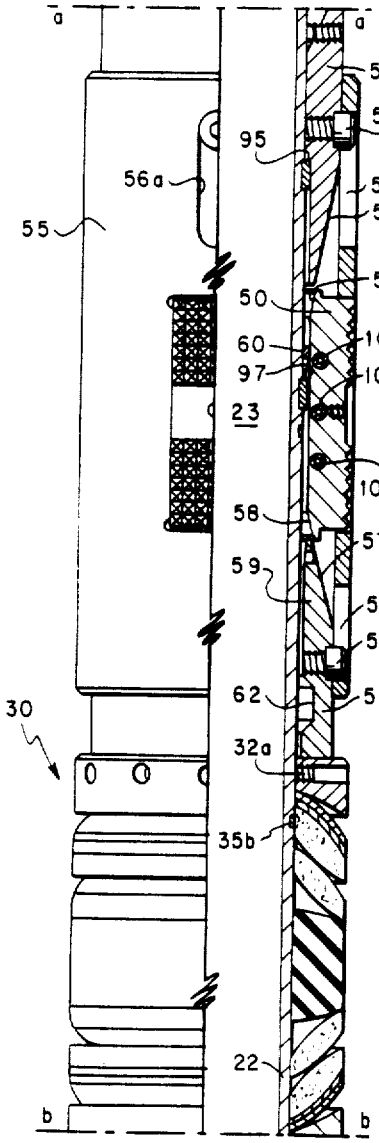
Figure 3C:
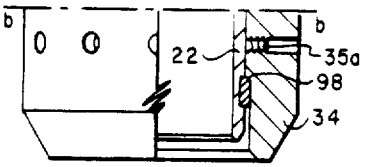
Figure 4:
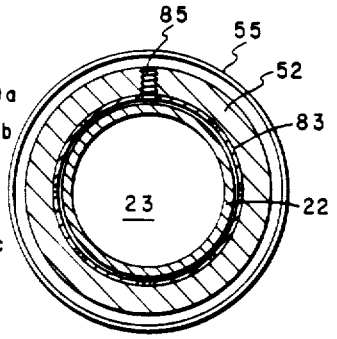
FIG. 4 is a cross section taken along line 4—4 of FIG. 1A.
Figure 5:
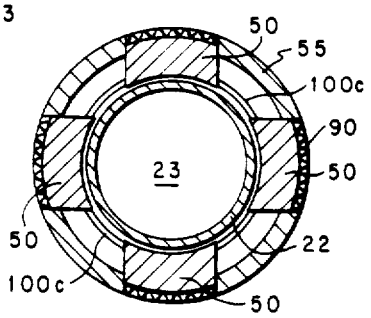
FIG. 5 is a cross section taken along line 5—5 of FIG. 1B showing the slip means in more detail.
Figure 6:
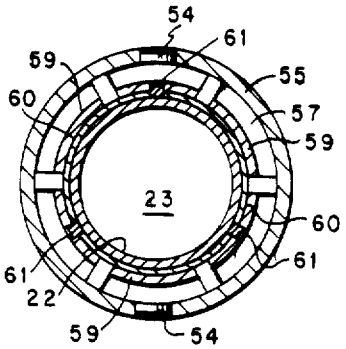
FIG. 6 is a cross section taken along line 6—6 of FIG. 1B showing the collect fingers and camming surfaces of the lower or second expander ring and the collet support ring.
Figure 7:
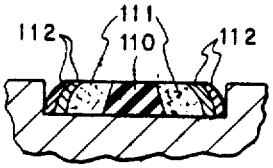
FIGS. 7, 8, 9, 10, 11, and 12 are schematic drawings, partially in section, showing various arrays of center elements, end elements, and backup rings or reinforcing discs which can be used on the sealing unit of the present invention.

The present invention includes means for releasing packer 20 from the inner wall of casing string 25 by merely applying a preselected amount of upward tension to tubing string 21. In FIGS. 3A, 3B, and 3C, packer 20 is shown being pulled from the casing (not shown) by tubing string 21. When a preselected amount of tension is applied to tubing string 21, screws 35 will shear into two portions 35a and 35b. Mandrel means 22 is then free to slide longitudinally in the one direction relative to slip means 50. Sealing unit 30 is also now free to slide over the exterior of mandrel means 22.

A first shoulder 95 is formed on the exterior of mandrel means 22 adjacent slip means 50. First slip expander ring 52 has a partially enlarged inside diameter 63 which forms a matching shoulder 64. When mandrel means 22 moves a preselected distance relative to slip means 50, first shoulder 95 will engage first expander ring 52 and pull camming surface 57 from behind slip means 50.

A second shoulder 97 is formed on the exterior of mandrel means 22 and spaced longitudinally from first shoulder 95. When mandrel means 22 has moved a preselected distance relative to slip means 50, second shoulder 97 will move collet support ring 60 from underneath collet fingers 59. Collet fingers 59 can then flex inwardly releasing second expander ring 53 from behind slip means 50.

As shown in FIG. 3B, first expander ring 52 has been lifted by first shoulder 95 from behind slip means 50. Lugs 54 on expander 52 are at the top of guide slots 56a. Lower expander ring 53 has dropped from behind slip means 50. Lugs 54 on expander ring 53 are resting at the bottom of guide slots 56b.

Each slip means 50 is connected to the other by three garter springs 100a, 100b, and 100c. The garter springs surround mandrel means 22. Each garter spring is disposed within a separate hole in the body of each slip means 50. Garter springs 100a, 100b and 100c provide a means for biasing slip means 50 inwardly away from casing 25. The body of slip means 50 is formed from a segment of a cylinder. The radius of the outside diameter of slip means 50 is preferably selected to match the radius of the inner wall of casing 25. The cross section of slip means 50 is generally rectangular with lips projecting from each end to retain slip means 50 within housing 55.

A third shoulder 98 is formed near end 22b of mandrel means 22. Second support ring 34 has a matching shoulder 99 formed on its inside diameter. When screws 32 and 35 are sheared, sealing unit 30 can slide freely over the exterior of mandrel means 22. Third shoulder 98 provides a means for catching sealing unit 30 and preventing it from falling off while packer 20 is being removed from the casing. The third position for sealing unit 30 is defined when both shear screws 32 and 35 are sheared.

As best shown in FIG. 3A, longitudinal movement of mandrel means 22 in the one direction relative to slip means 50 results in piston 46 and piston seals 47 becoming disengaged from piston housing 41. Variable volume fluid chamber 48 is now opened at one end which establishes a communication flow path through ports 43 and 44 to equalize fluid pressure between the exterior of packer 20 and longitudinal flow passage 23. Equalizing any difference in pressure is an important step in releasing packer 20 from casing 25.

As previously mentioned, packer 20 of the present invention is particularly adapted for use with high temperature and pressure fluids. Center element 37 and end elements 36a, 36b, 36c, and 36d form a direct seal between mandrel means 22 and the inner wall of casing 25. Sealing unit 30 thus prevents the hot fluids from contacting the inner wall of casing 25 above packer 20. Variable volume chamber 48 is filled with fluid while setting packer 20. This fluid within chamber 48 acts as a buffer to protect piston seals 47 from the hot, possibly corrosive fluids flowing through longitudinal flow passage 23.

One important feature of the present invention is that the packing elements of seal unit 30 can be easily changed to form various arrays for use with different well fluids. Third shoulder 98 is preferably a c-ring or snap ring which can be quickly removed from an annular groove near end 22b of mandrel 22. Shear screws 35 can be removed allowing second support ring 34 to slide off mandrel means 22. Backup rings 33, end elements 36 and center element 37 are sized to be slidable over the exterior of mandrel 22.

FIGS. 7–12 show various arrays of packing elements which can be satisfactorily used with packer 20. The array shown in FIG. 7 comprises a center element 110 manufactured from ethlene propylene-diene terpolymer, sometimes referred to as EPDM. End elements 111 are preferably made from vinylidene fluoride (VITON, a registered trademark belonging to DuPont) or hexafluoropropylene copolymer (FLUOREL, a registered trademark belonging to 3M Company). End elements 111 are preferably reinforced with wire mesh 0.005 inches in diameter and formed into a weave pattern 0.125 to 0.135 inches square. Six to twenty layers of the wire mesh are contained within each end element 111. Metal backup rings 112 are added on either side of end elements 111. Metal backup rings 112 minimize extrusion and loss of the elastomeric material when sealing unit 30 is compressed.

Figure 8:
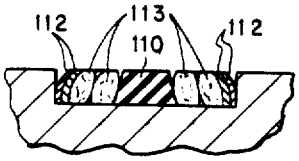

FIG. 8 shows an alternative end elements 113 made from asbestos rings reinforced with wire. End elements 113 also includes the unique cross section of the present invention when sealing unit 30 is relaxed. The cross section of end elements 113 is partially elliptical with the major axis of the ellipse slanted towards the centerline of center element 110. The cross section of end elements 113 is further defined by their inside and outside diameters being parallel cylindrical surfaces. As the packing array shown in FIG. 8 is compressed, the axis of the cross section of end elements 113 will move towards a less acute angle. Also, backup rings 112 are concaved to match the exterior of end elements 113. Metal backup rings 112 are flexible and will deform to maintain close contact with end elements 113 as the array is compressed. The combination of the unique cross section and matching concave, flexible backup rings results in first compressing the center element and then the end elements.

Figure 9:
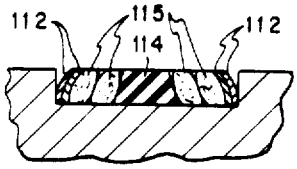

Another alternative array is shown in FIG. 9. This array comprises a center element 114 made from vinylidene fluoride or hexafluoropropylene copolymer. At high temperatures these compounds exhibit characteristics of more conventional elastomers. End elements 115 are preferably reinforced by wire 0.01 inches in diameter formed into a square mesh 0.18 to 0.25 inches on a side. Each element has 18 to 36 layers per section. Asbestos cord and/or ceramic fibers are dispersed throughout the wire mesh.

Figure 10:
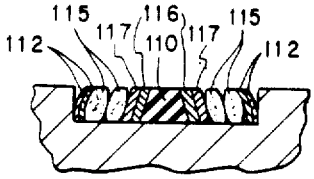

FIG. 10 discloses another packing array having multiple end elements. Two rings 116 of virgin polytetrafluorethylene (commonly referred to as TEFLON, a registered trademark belonging to DuPont) are disposed on either side of center element 110. Two rings 117 of polyphenylene sulfide resin (commonly referred to as RYTON, a registered trademark belonging to Phillips Petroleum) are next positioned adjacent rings 116.

Figure 11:
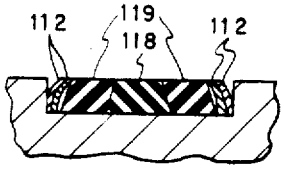

FIG. 11 shows an array in which center element 118 can be either the same as center elements 110 or 114. End element 119 is preferably formed from laminated, ribbon packing made out of carbon. This packing is sometimes referred to as GRAFOIL, a registered trademark of Union Carbide Corporation and disclosed in U.S. Pat. No. 3,404,061. Carbon packing element 119 is reinforced with wire mesh.

Figure 12:
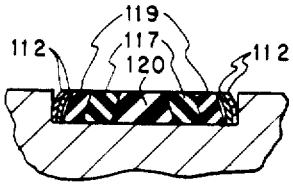

FIG. 12 shows the final array of the present invention comprising a center element 120 made from the same material as ring 116. End elements 117 and 119 are used in combination with center element 120.

Figure 16C:
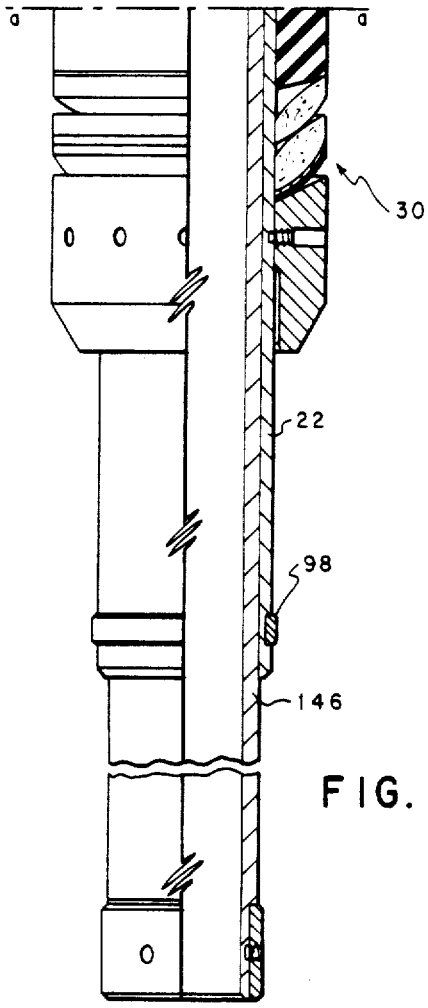
FIGS. 16A, B, and C are drawings, partially in section and partially in elevation, showing a mechanically set packer of the present invention with the anchoring means and the sealing unit each in their first position.

An alternative means for anchoring packer 130 incorporating the present invention to the inner wall of a casing string is shown in FIGS. 16A, 16B, and 16C. Packers which are mechanically set by rotating tubing at the well surface are well known. U.S. Pat. No. 3,385,366 discloses a packer which is mechanically set by J-slots engaging a lug, drag springs rubbing against the inner wall of a casing string, and rotating the tubing. U.S. Pat. No. 3,385,366 is incorporated by reference for all purposes.

Mandrel means 22 is essentially the same in both packer 20 and 130. The various components carried on the exterior of mandrel means 22 between first expander ring 52 and third shoulder 93 are identical and have been given the same number. In packer 130 adapter sub 22c is used instead of adapter sub 22a.

Adapter sub 22c is attached to and forms a portion of mandrel means 22. The outside diameter of adapter sub 22c has left-hand acme threads 131 formed thereon. Spring carrier 132 is rotatably secured to the exterior of mandrel means 22 by engagement with acme threads 131. Boss 133 is welded to the exterior of adapter sub 22c and spaced longitudinally from threads 131. Boss 133 limits the longitudinal movement of spring carrier 132 when carrier 132 is rotated to the left with respect to mandrel means 22. Spring carrier 132 is generally cylindrical with three bow or drag springs 134 extending radially therefrom. Screws 135 are used to attach bow springs 134, carrier 132 and first expander ring 52 together as a single rotating unit. Bow springs 134 are sized to rub against the inner wall of a casing string (not shown). When mandrel means 22 is rotated to the right, bow springs 134 limit the rotation of carrier 132 by dragging against the inner wall of the casing. Left-hand acme threads 131 thus cause carrier 132 and first expander ring 52 to move longitudinally in the one direction relative to mandrel means 22. This longitudinal movement results in expander rings 52 and 53 moving towards each other radially projecting slip means 50 and compressing sealing unit 30 as previously explained.

For packer 130, rough surface 86 is preferably a triple left-hand thread having the same pitch as threads 131. The teeth on the inside diameter of wedge 83 are machined to match rough surface 86. Therefore, internal slip means 80 will make one revolution around mandrel means 22 in unison with spring carrier 132.

Top sub 136 is engaged by threads to adapter sub 22c. O-ring sleeve 137 is secured on the inside diameter of packer 130 between top sub 136 and adapter sub 22c. Top sub 136 has lug 138 which projects into the bore of packer 130.

The running tool used to install and set packer 130 comprises J-slot mandrel 139 disposed within the bore of top sub 136. J-slot mandrel 139 has threads 140 at one end for attachment to a tubing string (not shown). J-slot mandrel 139 is releasably secured to top sub 136 by shear sleeve 141 and shear screws 142. Shear sleeve 141 prevents packer 130 from disengaging from J-slot mandrel 139 while being installed in the casing. Shear sleeve 141 has an internal shoulder 143 spaced longitudinally from a matching shoulder 144 on the exterior of J-slot mandrel 139. The spacing between shoulders 143 and 144 allows for limited longitudinal movement of J-slot mandrel 139 relative to top sub 136 without shearing screws 142. J-slots 145 are machined in the exterior of mandrel 139. J-slots 145 are sized for engagement with lugs 138. Rotation of tubing (not shown) connected by threads 140 to J-slot mandrel 139 is transmitted to rotate top sub 136 by lugs 138.

Polished sleeve 146 is attached to the end of J-slot mandrel 139 opposite threads 140. Preferably, the exterior of polished sleeve 146 has a smooth, honed surface to form a fluid tight seal with o-rings 147 on the inside diameter of o-ring sleeve 137.

Packer 130 is attached to J-slot mandrel 139 as shown in FIG. 16A and run into the bore of a casing string (not shown) by a tubing string (not shown) attached to threads 140. When packer 130 has been lowered to the desired depth intermediate the ends of the casing string, the tubing string is rotated to right. Rotation of the tubing string is transmitted to J-slot mandrel 139, top sub 136 by lugs 138, and mandrel means 22 by adapter sub 22c threadedly engaged with top sub 136. Bow springs 134 drag against the inner wall of the casing string minimizing rotation of spring carrier 132. Since spring carrier 132 does not rotate freely, left-hand acme threads 131 cause spring carrier 132 to move in one direction longitudinally with respect to mandrel means 22. As previously explained for packer 30, this longitudinal movement in one direction results in first expander ring 52 moving towards second expander ring 53 to project slip means 50 radially from mandrel means 22.

Threads 131 are preferably sized such that after fourteen turns to the right spring carrier 132 will be disengaged from mandrel means 22. As previously noted, threads forming rough surface 86 and threads on the inside diameter of wedge 83 are matched allowing this rotation to simultaneously move internal slip means 80 in the one direction.

After slip means 50 initially engages the inner wall of the casing string, J-slot mandrel 139 is lowered and rotated to the left to engage lugs 138 in the short portion of J-slots 145. A preselected amount of tension is then applied to the tubing string and J-slot mandrel 139 to fully engage slip means 50 with the casing and place sealing unit 30 in its second position. When the tension is released from J-slot mandrel 139, internal slip means 80 locks expander rings 52 and 53 in position relative to each other. After packer 130 is set J-slot mandrel 139 is released from lugs 138 and the tubing spaced out as required.

The foregoing description of the present invention is only an explanation of some of the preferred embodiments. Various changes and modifications will be readily apparent to those skilled in the art without departing from the scope of the invention which is defined in the claims.

What is claimed is:

1. A packer for forming a seal with the inner wall of a casing string comprising:

a. means for connecting the packer to a tubing string;

b. mandrel means having a longitudinal flow passage to provide fluid communication through the packer;

c. means for anchoring the packer to the inner wall of the casing string intermediate the ends of the casing string;

d. means for releasing the packer from the inner wall of the casing string;

e. a sealing unit, attached to the exterior of the mandrel means, having a first position in which the sealing unit is relaxed and a second position in which the sealing unit is longitudinally compressed and radially expanded to contact the inner wall;

f. the sealing unit comprising a center element made from elastomeric material and end elements of elastomeric material and wire mesh;

g. each end element having a partially elliptical cross section with parallel cylindrical inside and outside diameters;

h. the major axis of the partially elliptical cross sections forming an acute angle with the exterior of the mandrel means when the sealing unit is in its first position; and i. the major axis moving towards a position normal to the mandrel means when the sealing unit is in its second position.

2. A packer as defined in claim 1, wherein the anchoring means further comprises:

a. housing means mounted on the exterior of the mandrel means;

b. openings in the housing means;

c. slip means, disposed within said openings, having a first position retracted within the housing means and a second position partially extended from the mandrel means through the openings;

d. a first slip expander ring and a second slip expander ring slidably carried on the exterior of the mandrel means at opposite ends of the housing means;

e. camming surfaces on each expander ring for engaging the slip means to project the slip means through the openings; and f. means for moving the first expander ring towards the second expander ring to project the slip means.

3. A packer for forming a seal with the inner wall of a casing string comprising:

a. means for connecting the packer to a tubing string;

b. mandrel means having a longitudinal flow passage to provide fluid communication through the packer;

c. means for anchoring the packer to the inner wall of the casing string intermediate the ends of the casing string;

d. the anchoring means further comprising:

i. housing means mounted on the exterior of the mandrel means;

ii. openings in the housing means;

iii. slip means, disposed within said openings, having a first position retracted within the housing means and a second position partially extended from the mandrel means through the openings;

iv. a first slip expander ring and a second slip expander ring slidably carried on the exterior of the mandrel means at opposite ends of the housing means;

v. camming surfaces on each expander ring for engaging the slip means to project the slip means through the openings;

vi. means for moving the first expander ring towards the second expander ring to project the slip means;

e. means for releasing the packer from the inner wall of the casing string;

f. a sealing unit, attached to the exterior of the mandrel means, having a first position in which the sealing unit is relaxed and a second position in which the sealing unit is longitudinally compressed and radially expanded to contact the inner wall;

g. the means for releasing the packer further comprising:

i. the camming surface on the second ring formed on inwardly flexible collet fingers;

ii. a collet support ring slidably disposed between the collet fingers and the mandrel means;

iii. the collet support ring preventing the collet fingers from flexing inwardly;

iv. the collet support ring being releasably secured to the collet fingers; and v. means, carried on the exterior of the mandrel means, for engaging the collet support ring and releasing the collet fingers after the mandrel means has moved longitudinally a preselected distance relative to the second expander ring allowing the second expander ring to disengage from the slip means.

4. A packer as defined in claim 3, wherein the sealing unit further comprises:

a. a first support ring engaged by first releasable means to the mandrel means;

b. a second support ring engaged by second releasable means to the mandrel means;

c. metal backup rings, the end elements and the center elements carried on the exterior of the mandrel means between the two support rings;

d. the first support ring spaced a fixed distance longitudinally from the second support ring when the seal unit is in its first position;

e. the second slip expander ring abutting the first support ring;

f. the first releasable means requiring less force to disengage the first support ring from the mandrel means than is required to release the second releasable means and disengage the second support ring from the mandrel means; and g. longitudinal movement of the mandrel means, after the slip means has engaged the inner wall of the casing string, releasing the first support ring from the mandrel means and compressing the center and end elements between the second support ring and the first support ring.

5. A packer as defined in claim 4, wherein the means for releasing the packer further comprises:

a. a first shoulder on the exterior of the mandrel means and engageable with the first expander ring and a second shoulder on the exterior of the mandrel means and engageable with the collet support ring;

b. each shoulder spaced a preselected distance longitudinally from the first expander ring and collet support ring when the slip means and sealing unit are in their second position;

c. the force required to release the second releasable means preselected to allow the second support ring to be disengaged from the mandrel means prior to the second shoulder contacting the collet support ring; and d. means, carried near the lower end of the mandrel means, for catching the sealing unit after the second support ring has been disengaged.

6. A packer, as defined in claim 3, wherein the means for moving the first slip expander ring comprises:

a. a piston housing secured to the exterior of the mandrel means and a piston means slidably disposed therein;

b. a variable volume fluid chamber within the piston housing and partially defined by the piston means;

c. ports communicating the longitudinal flow passage of the mandrel means with the fluid chamber; and d. one end of the piston means engaging the first expander ring.

7. A packer, as defined in claim 6, wherein the means for moving the first slip expander ring further comprises:

a. internal slips disposed between the first expander ring and the exterior of the mandrel means;

b. the exterior of the mandrel means having a rough surface for engagement with the internal slips; and c. the internal slips allowing movement of the first expander ring in one direction relative to the mandrel means and preventing movement in the other direction.

8. A packer, as defined in claim 3, wherein the means for moving the first slip expander ring comprises:

a. a spring carrier rotatably secured to the exterior of the mandrel means;

b. the spring carrier functionally connected to the first slip expander ring;

c. springs extending from the spring carrier and engageable with the inner wall of the casing string;

d. the means for connecting the packer to the tubing string including a lug allowing rotation of the tubing string to rotate the mandrel means; and e. threads formed on the exterior of the mandrel means and engaged with matching threads on the interior of the spring carrier whereby rotation of the mandrel means is translated into longitudinal movement of the spring carrier.

9. A packer, as defined in claim 3, wherein the slip means further comprises:

a. a body, formed from a segment of a cylinder, having an inside diameter and an outside diameter;

b. diamond shaped serrations on the outside diameter of the body;

c. the radius of the outside diameter conformimg generally to the radius of the inner wall of the casing string;

d. the inside diameter having frusto-conical surfaces near each end of the body; and e. the frusto-conical surfaces generally matching the camming surfaces of the first and second expander rings.

10. A packer, as defined in claim 3, wherein the anchoring means further comprises:

a. the housing being generally cylindrical and surrounding the mandrel means;

b. guide slots cut in the housing near each end;

c. a guide lug secured to each expander ring and disposed in the guide slots allowing limited longitudinal movement of the expander rings with respect to the housing; and d. the expander rings and housing being generally slidable over the exterior of the mandrel means.

11. In a packer for forming a seal with the inner wall of a casing string and having a sealing unit carried on a mandrel means, the sealing unit comprising:

*a. a center element;*

[a.] *b.* each end element having a partially elliptical cross section with parallel cylindrical inside and outside diameters;

[b.] *c.* the major axis of the partially elliptical cross sections forming an acute angle with the exterior of the mandrel means when the sealing unit is in its first position; and

[c.] *d.* the major axis moving towards a position normal to the mandrel means when the sealing unit is in its second position.

12. A packer as defined in claim 11 wherein:

a. the center element is selected from the group consisting of ethylene propylene-diene terpolymer, vinylidene fluoride and hexafluoropropylene copolymer, and polytetrafluoroethylene; and b. the end elements are selected from the group consisting of vinylidene fluoride, hexafluoropropylene copolymer, asbestos, graphite, and ceramic fibers with each being reinforced by wire mesh.

13. A packer for forming a seal with the inner wall of a casing string, comprising:

a. means for connecting the packer to a tubing string disposed within the casing string;

b. mandrel means having a longitudinal flow passage to provide fluid communication through the packer;

c. a sealing unit attached to the exterior of the mandrel means;

d. the sealing unit comprising an upper support ring and a lower support ring with backup rings and elastomeric material disposed between the support rings;

e. the sealing unit having a first position in which the support rings are releasably secured at fixed locations on the mandrel means and spaced longitudinally from each other with the elastomeric material relaxed;

f. the sealing unit having a second position in which the upper support ring is released from its fixed location on the mandrel means and the lower support ring has been moved towards the upper support ring by the mandrel means compressing the elastomeric material therebetween;

g. the sealing unit having a third position in which both the upper and lower support rings are released from their fixed positions on the mandrel means and the sealing unit can slide over the exterior of the mandrel means with the elastomeric material relaxed;

h. means for anchoring the packer to the inner wall of the casing string and moving the lower support ring towards the upper support ring placing the sealing unit in its second position;

i. means for releasing the packer from the inner wall and moving the sealing unit to its third position;

j. the anchoring means further comprising a cylindrical housing slidably mounted on the exterior of the mandrel means;

k. a plurality of radial openings in the housing;

l. slips, disposed within the openings, having a first position retracted within the housing and a second position partially extended through the openings;

m. an upper slip expander ring and a lower slip expander ring slidably carried on the exterior of the mandrel means near opposite ends of the housing;

n. camming surfaces on each expander ring for engaging a matching surface on the slips;

o. the lower expander ring abutting the upper support ring of the sealing unit;

p. means for moving the upper expander ring towards the lower expander ring thereby projecting the slips through the openings;

q. the force required to release the upper support ring from the mandrel means being preselected to allow the slips to engage the inner wall before the upper support ring is released from the mandrel means; and r. the means for moving the upper expander ring applying force to the mandrel means to move the sealing unit to its second position after the slips have engaged the inner wall.

14. A packer as defined in claim 13, wherein the means for moving the upper slip expander ring comprises:

a. a piston housing secured to the exterior of the mandrel means and a piston means slidably disposed therein;

b. a variable volume fluid chamber within the piston housing and partially defined by the piston means;

c. ports communicating the longitudinal flow passage of the mandrel means with the fluid chamber; and d. one end of the piston means engaging the upper expander ring.

15. A packer as defined in claim 13, wherein the means for moving the upper slip expander ring comprises:

a. a spring carrier rotatably secured to the exterior of the mandrel means;

b. the spring carrier engaged with the upper slip expander ring;

c. springs extending from the spring carrier and engageable with the inner wall of the casing string;

d. the means for connecting the packer to the tubing string including a lug to allow rotation of the tubing string to rotate the mandrel means; and e. threads formed on the exterior of the mandrel means and engaged with matching threads on the interior of the spring carrier whereby rotation of the mandrel means is translated into longitudinal movement of the spring carrier.

16. A packer as defined in claim 13, wherein the means for releasing the packer comprises:

a. the camming surfaces on the lower expander ring formed on inwardly flexible collet fingers;

b. a collet support ring releasably disposed between the collet fingers and the mandrel means;

c. the collet support ring preventing the collet fingers from flexing inwardly when the slips are in their second position;

d. a first shoulder on the exterior of the mandrel means engageable with the inside diameter of the upper expander ring;

e. a second shoulder on the exterior of the mandrel means engageable with the collet support ring;

f. the first and second shoulders spaced longitudinally from each other allowing upward movement of the mandrel means with the slips in their second position to remove the collet support ring from below the collet fingers releasing the lower expander ring from contacting the slips and to remove the upper expander ring from contacting the slips; and g. the longitudinal movement of the mandrel means releasing the lower support ring of the sealing unit and shifting the sealing unit to its third position before the first and second shoulders engage the upper expander ring and collet support ring respectively.

17. In a well packer, for sealing between the outside diameter of a tubing string and the inside diameter of a casing string disposed within a well bore, the sealing unit, carried on the exterior of a mandrel means, comprising a center element, end elements, and backup rings wherein:

a. the center element is selected from the group consisting of ethlene propylene-diene terpolymer, vinylidene fluoride and hexafluoropropylene copolymer, and polytetrafluoroethylene; and b. the end elements are selected from the group consisting of vinylidene fluoride, hexafluoropropylene copolymer, asbestos, graphite, and ceramic fibers with each being reinforced by wire mesh.

18. In a well packer, for sealing between the outside diameter of a tubing string and the inside diameter of a casing string disposed within a well bore, a sealing unit, carried on the exterior of a mandrel means, comprising a center element, end elements and backup rings wherein the end elements further comprise rings, each having a partially elliptical cross section with parallel cylindrical surfaces on the inside and outside diameter thereof.

19. A sealing unit, as defined in claim 18, further comprising:

a. an upper support ring engageable by first shear screws to the mandrel means;

b. a lower support ring engageable by second shear screws to the mandrel means;

c. metal backup rings adjacent to each support ring with the center element and end elements disposed between the backup rings; and d. the force required to shear the first shear screw less than the force required to shear the second shear screw.

20. A packer for forming a seal with the inner wall of a casing string comprising:

a. means for connecting the packer to a tubing string;

b. mandrel means having a longitudinal flow passage to provide fluid communication through the packer;

c. means for anchoring the packer to the inner wall of the casing string intermediate the ends of the casing string;

d. means for releasing the packer from the inner wall of the casing string;

e. a sealing unit, attached to the exterior of the mandrel means, having a first position in which the sealing unit is relaxed and a second position in which the sealing unit is longitudinally compressed and radially expanded to contact the inner wall;

f. the mandrel means movable longitudinally in one direction with respect to the anchoring means to move the sealing unit to its second position after the packer has been anchored to the inner wall;

g. internal slips carried within the packer and engageable with the exterior of the mandrel means;

h. teeth on the internal slips allowing movement of the mandrel means in the one direction and preventing movement in the other direction; and i. the exterior of the mandrel means having a rough surface designed to match the teeth on the internal slips.

21. A packer, as defined in claim 20, wherein the rough surface on the exterior of the mandrel means comprises a triple thread.

22. A packer, as defined in claim 20, wherein the anchoring means resists movement of the packer in either direction with respect to the inner wall of the casing string.

* * * * *